(12) United States Patent
Lage

(10) Patent No.: US 6,246,028 B1
(45) Date of Patent: Jun. 12, 2001

(54) DEVICE FOR HEATING A BLOWN FILM WEB, INFLATED INTO A BLOWN FILM BUBBLE BETWEEN A PAIR OF FORWARD DRAW ROLLS AND A PAIR OF TAKE OFF ROLLS

(75) Inventor: Karl-Heinz Lage, Lengerich (DE)

(73) Assignee: Windmöller & Hölscher, Lengerich (DE)

( * ) Notice: Subject to any disclaimer, the term of this patent is extended or adjusted under 35 U.S.C. 154(b) by 0 days.

(21) Appl. No.: 09/528,026

(22) Filed: Mar. 17, 2000

(30) Foreign Application Priority Data

Mar. 17, 1999 (DE) .............................. 199 11 978

(51) Int. Cl.[7] .............. B29C 55/28; F27B 9/36
(52) U.S. Cl. .................. 219/388; 219/404; 425/66; 425/140
(58) Field of Search .................. 219/388, 404, 219/535; 264/492, 495; 425/66, 140, 174.4, 384

(56) References Cited

U.S. PATENT DOCUMENTS

| | | | |
|---|---|---|---|
| 3,904,342 | * | 9/1975 | Sato et al. ...................... 425/384 |
| 4,201,741 | * | 5/1980 | Pannenbecker ................. 425/140 |
| 4,212,908 | * | 7/1980 | Hendy et al. ................... 425/384 |
| 4,443,399 | * | 4/1984 | Takashige et al. .............. 425/174.4 |
| 5,891,480 | * | 4/1999 | Schmidt et al. ................. 425/66 |

FOREIGN PATENT DOCUMENTS

| | | |
|---|---|---|
| 38 02 146 | 2/1989 | (DE) . |
| 19816119 | * 10/1999 | (DE) . |
| 198 44 434 | 6/2000 | (DE) . |
| 2 736 861 | 1/1997 | (FR) . |
| 3-90332 | 4/1991 | (JP) . |
| 6-106620 | 4/1994 | (JP) . |

* cited by examiner

Primary Examiner—Joseph Pelham
(74) Attorney, Agent, or Firm—Jacobson, Price, Holman & Stern, PLLC

(57) ABSTRACT

Device for heating a blown film web, inflated into a blown film bubble between a pair of forward draw rolls and a pair of take off rolls, comprises a frame mounted, driven pair of forward draw rolls and an opposite, stationarily mounted, driven pair of take off rolls for the blown film web hauled off the inflated bubble. Furthermore, there are collapsing mechanisms and mechanisms for inflating and heating the blown film web. To feed the correct amount of heat to the inflated web independently of its diameter, the heating devices comprise heating elements, which are arranged concentricly around the axis of the inflated blown film web and which can be moved toward and away from the blown film web by means of regulating drives in the radial direction.

10 Claims, 5 Drawing Sheets

DEVICE FOR HEATING A BLOWN FILM WEB, INFLATED INTO A BLOWN FILM BUBBLE BETWEEN A PAIR OF FORWARD DRAW ROLLS AND A PAIR OF TAKE OFF ROLLS

The invention relates to a device for heating a blown film web, inflated into a blown film bubble between a pair of forward draw rolls and a pair of take off rolls. The device comprises a frame mounted, driven pair of forward draw rolls for a flat lying blown film web, comprises an opposite, stationarily mounted, driven pair of take off rolls, which are intended for the collapsed blown film web hauled off the inflated bubble, and upstream of which are collapsing mechanisms, preferably wedge shaped collapsing boards; comprises mechanisms for inflating the blown film web between the pairs of forward draw and take off rolls into a bubble and for refilling blowing air; and comprises a device for heating the inflated blown film web.

It is known to inflate a plastic blown film web, produced in the blown film process and wound into a roll, into a bubble by blowing up again and then to stretch by heating in order to achieve other properties or to improve strength values. In so doing, the heating is conducted at temperatures that are necessary to achieve the desired modified film properties. Preferably the inflated blown film web is heated in the area of its inflow into the bubble up to approximately its heat deformation temperature (glass transition temperature). The blown film web, pulled in by the pair of forward draw rolls, is blown up using injection needles. In this process the injection needles can be arranged so as to travel along or rotate in order to maintain the air pressure in the blown film bubble. The blown film web can also be inflated by evaporating the liquids.

A device of the aforementioned type is disclosed, for example, in the DE 198 44 434.6. In this prior art device the web of plastic film that is inflated into a tube is heated by frame mounted heating rings with infrared radiators, which enclose concentricly the tube of film.

However, one special problem associated with the devices ofthe aforementioned type lies in the fact that webs of plastic film that are inflated into tubes of film and that exhibit varying diameters are to be stretched again by inflating into a bubble. However, the requisite amount of energy to be delivered to the inflated tube can be supplied only with difficulty if the diameters ofthe heating rings are not adapted to the diameters of the film tube that is to be stretched again.

Therefore, the object of the invention is to provide a device of the aforementioned type, wherein the necessary amount of heat for inflating the blown film web into a bubble can be fed as desired with the heating device even if the diameter of the tube to be inflated varies.

The invention solves this problem in that the heating device comprises heating elements, which are arranged concentricly around the axis of the inflated blown film web and which can be moved toward and away from the blown film web by means of regulating drives in the radial direction.

In the device according to the invention the correct amount of heat for inflating into a bubble can be fed in a purposeful manner to the blown film web to be inflated into a tube in that the individual heating elements always exhibit the correct or desired radial distance from the blown film web.

Preferably the regulating drives move all of the heating elements simultaneously in the radial direction. To move the individual heating elements, servomotors can be provided that are controlled by a controller.

A preferred embodiment provides that the regulating drives comprise parallel cores, which are mounted stationarily on the frame and whose inner coupling members bear the heating elements, and that the coupling members are provided with slide bolts for the purpose of moving said coupling members radially. Said slide bolts are guided in oblong slots of an adjusting element, which lies parallel to the coupling member. To move the adjusting elements radially, there are spindle drives. The spindle drives can be driven over bevel gears by means a driven revolving chain.

Preferably the heating elements, which are mounted stationarily on the frame, are arranged between heating elements, moved to the largest diameter. This design accounts for the circumstance that the distance between the heating elements decreases in the circumferential direction when they are moved radially inwardly.

It is expedient that the heating elements be infrared radiators.

A preferred embodiment of the invention provides that the oblong heating elements are slanted relative to the axis of the blown film web. This design ensures that all of the film sectors sweep over the heating elements, whereby, seen in the axial direction, the end regions of the inclined heating elements can overlap advantageously.

Another embodiment of the invention provides a distance meter, which scans the diameter of the blown film web and whose signals are fed to a controller, which controls the regulating motor or motors for moving the heating elements to the desired distance. This design guarantees that in the device according to the invention two for stretching the blown film web of varying diameter adjust the heating elements always automaticly to the correct radial distance relative to the inflated tube.

Another preferred embodiment provides a device, measuring the density distribution of the wall thickness over the circumference of the blown film web or the collapsed film tube hauled off the bubble, and a regulator, which controls the amount of heating energy, fed to the respective heating elements in proportion to the deviation of the measured film thickness from the average film thickness (desired value). According to this design, the heating device feeds in the circumferential direction varying amounts of heat to the individual film sectors. Differential heating of a film tube over its circumference to compensate for the fluctuations in thickness is known and hence does not need to be described here in detail.

Another embodiment provides a device, measuring the thickness distribution of the wall thickness over the circumference of the blown film bubble or the collapsed film tube hauled off the bubble, and a regulator, which controls in such a maimer the regulating motors, assigned to the individual heating elements, that a proportionally greater or smaller amount of heat is fed to the respective film sectors. According to this design, the varying amounts of heat are not fed by radiating larger or smaller amounts of heat from the heating elements, but by suitably increasing or decreasing the radial distance between the heating elements and the wall of the film tube.

One embodiment of the invention is explained in detail below with reference to the drawings, in which FIG. 1 is a schematic drawing of a device for inflating and stretching a flat lying blown film web pulled from a supply roll.

Figure 1:
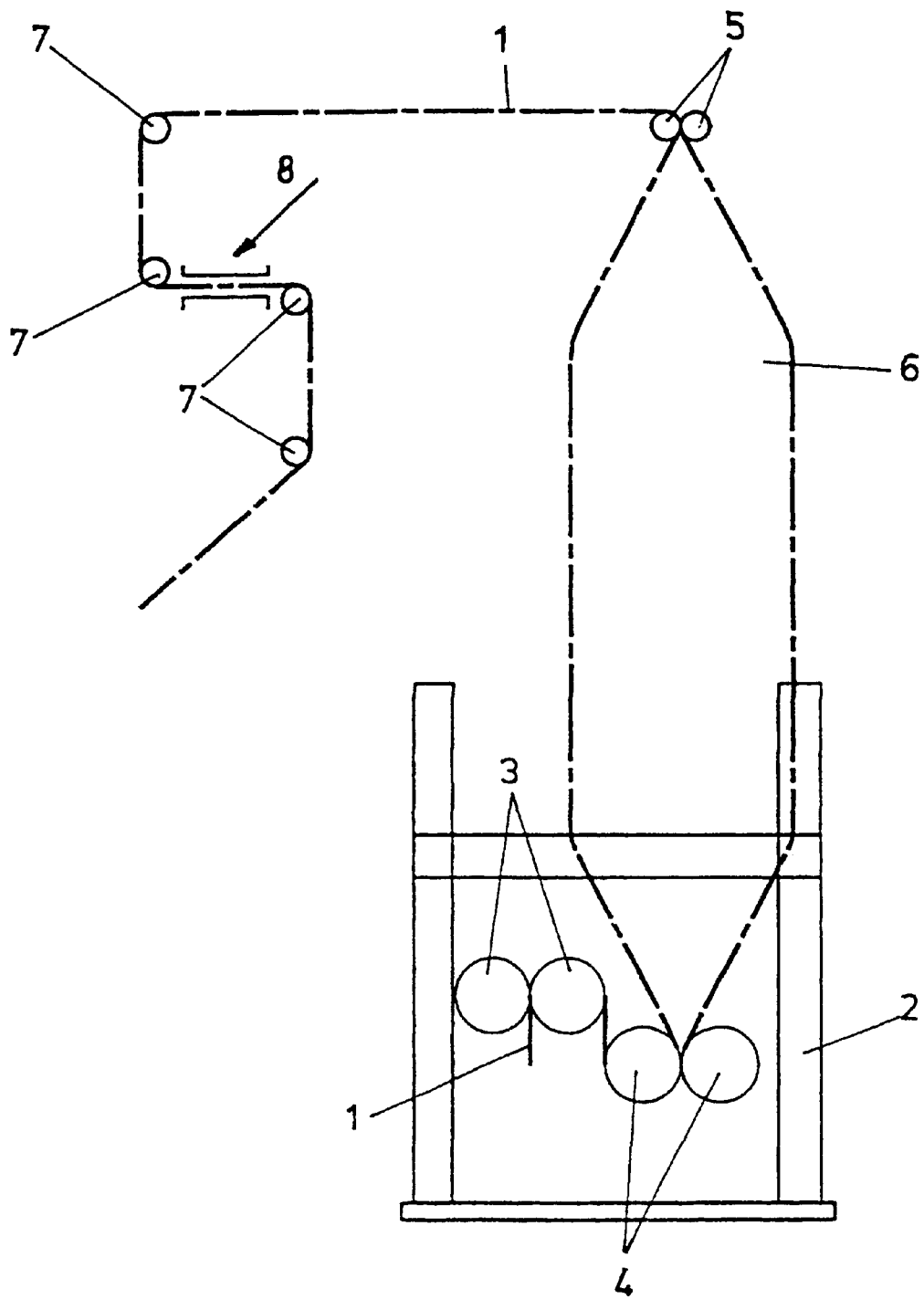

FIG. 1 is a schematic drawing of a device for pulling a plastic blown film web from a roll of blown film (not illustrated). In this device the blown film web 1 is pulled forward by a pair of driven forward draw rolls 3, 4 that are mounted in a frame 2. Above the pair of forward draw rolls 4 is a pair of pinch and take off rolls 5, which are mounted in the frame or mounted stationarily and which haul the restretched film tube from the bubble 6 and lay it flat The collapsed and restretched blown film web 1 runs over deflecting rolls 7 and a thickness meter 8 to a wind up unit, where the blown film web 1 is rewound into a blown film roll.

The basic construction of the device corresponds to the. device, which is disclosed in the DE 198 44 434.6 and to which reference will be made for detail.

The heating device 10 for heating the inflated segment of the blown film web 1 is mounted in the frame. The web is heated in such a manner in the heating device 10 that the web is inflated into a bubble 1' owing to the internal pressure while issuing from the heating device 10. The heating device 10 comprises a housing 11, which encloses the blown film web and whose upper and lower ends bear iris diaphragms 12, 13, which can be adjusted to the diameter of the entering tube and the diameter of the issuing film tube, which is already partially inflated to the diameter of the bubble 1', thus avoiding heat losses.

In the housing the parallel cores 15, 16, whose internal ends are connected by means of a double member 17 so as to be hinged, are pivot mounted on carriers 14, arranged at equidistances on a ring enclosing concentricly the film tube 1. The guides 15, 16 bear bolts 18, which are guided in oblong slots 19 of an adjusting element 20 comprising a flat steel bar. The adjusting element 20 is connected at right angles to a spindle 22, which is screwed into a spindle nut 23 that is mounted so as to rotated in a frame. All spindle nuts 23, assigned to spindles 22, bear bevel gears 24, which mesh with frame mounted counter bevel gears 25. In so doing, the sprocket wheels 27, over which a common drive chain 28 runs, are keyed on the shafts 26, bearing the counter bevel gears 25 and mounted in the frame. The drive chain 28 is driven by means of a drive motor 29, whose output sprocket wheel 30 is drive connected by means of a chain 31 to a sprocket wheel 32, which is keyed on a shaft 26 bearing a counter bevel gear 25 and a sprocket wheel 27.

Also mounted in the frame is a distance sensor 35, which measures the respective diameter of the web 1 that is pulled in and inflated into a tube.

The signals of the distance sensor 35 are fed to a computer 36, which sets in proportion to the measured diameter of the film tube that is pulled in and inflated the adjusting elements 17 to the requisite radial distance relative to the film tube 1 by way of the motor 29 and the described drives. The adjusting elements 17 bear infrared heating elements whose energy supply is controlled or regulated by the computer 36.

If the thickness meter 8 senses differences in the thickness of the film sectors of the bubble 1 and these differences are to be balanced, the computer feeds a respectively greater or smaller amount of energy to the infrared radiators assigned to the respective film sectors.

Figure 2:
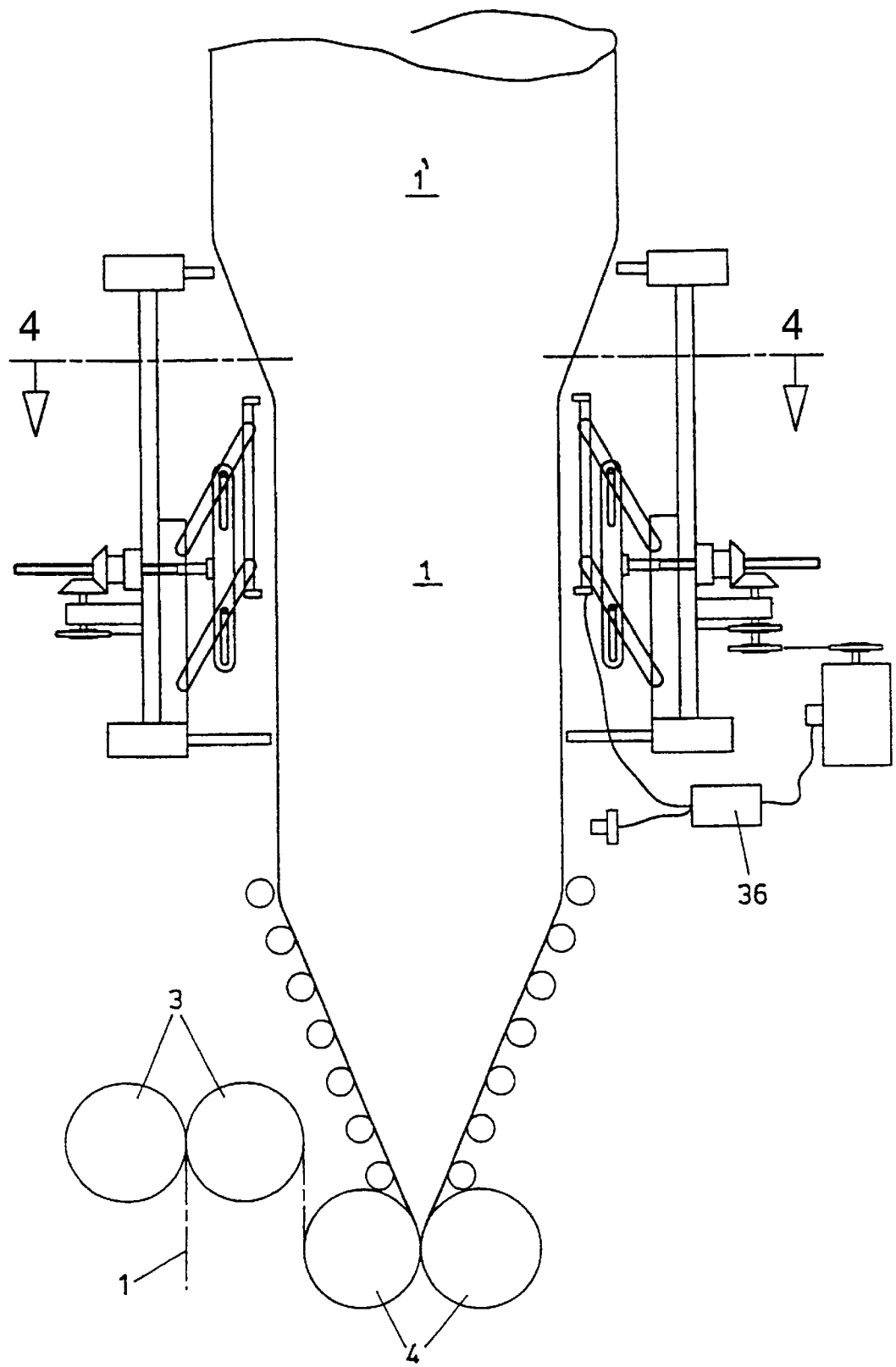
FIG. 2 is an enlarged view of the device of FIG. I with a ring, which encloses the inflated film tube and which comprises heating elements, moved to their largest ring diameter.
Figure 4:
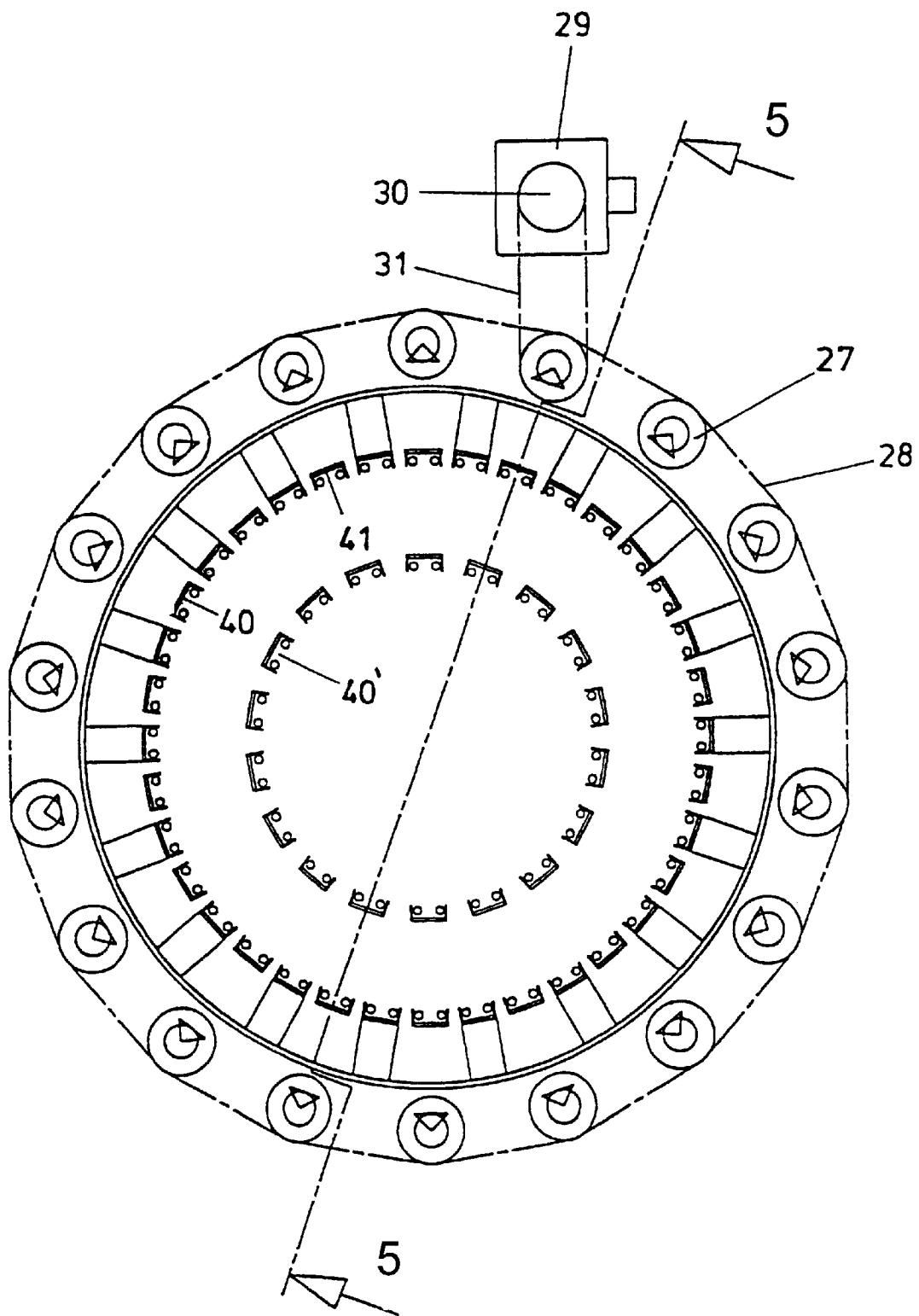
FIG. 4 is a top view of the rings of heating elements along the lines IV—IV in FIGS. 2 and 3 and FIG. 5 is a top view of the heating elements along the line V—V in FIG. 4.

FIG. 4 shows that the infrared radiators 41 that are mounted stationarily on the frame are arranged between the infrared radiators 40 which are moved to their largest radial distance. In FIG. 4 the infrared radiators 4, which are located on the outer ring, are in their state, in which they are moved to their largest diameter and which is equivalent to the state depicted in FIG. 2.

Figure 3:
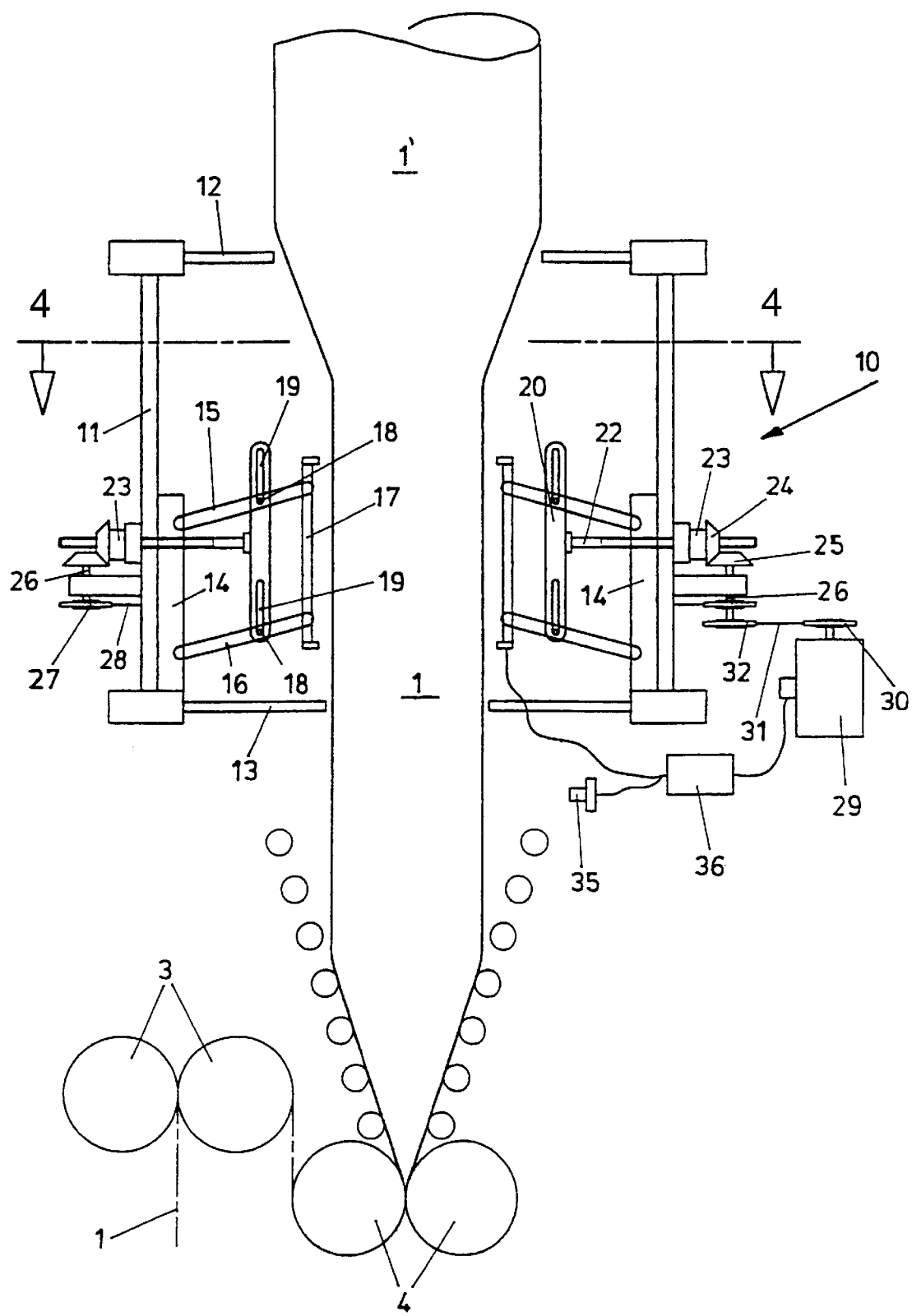
FIG. 3 depicts a device according to FIG. 2, where the heating elements, forming the ring, are moved to their smallest diameter.

Furthermore, FIG. 4 shows the infrared radiators 40', which are located on the inner ring and hence moved to their smallest diameter. This state is depicted in FIG. 3.

Figure 5:
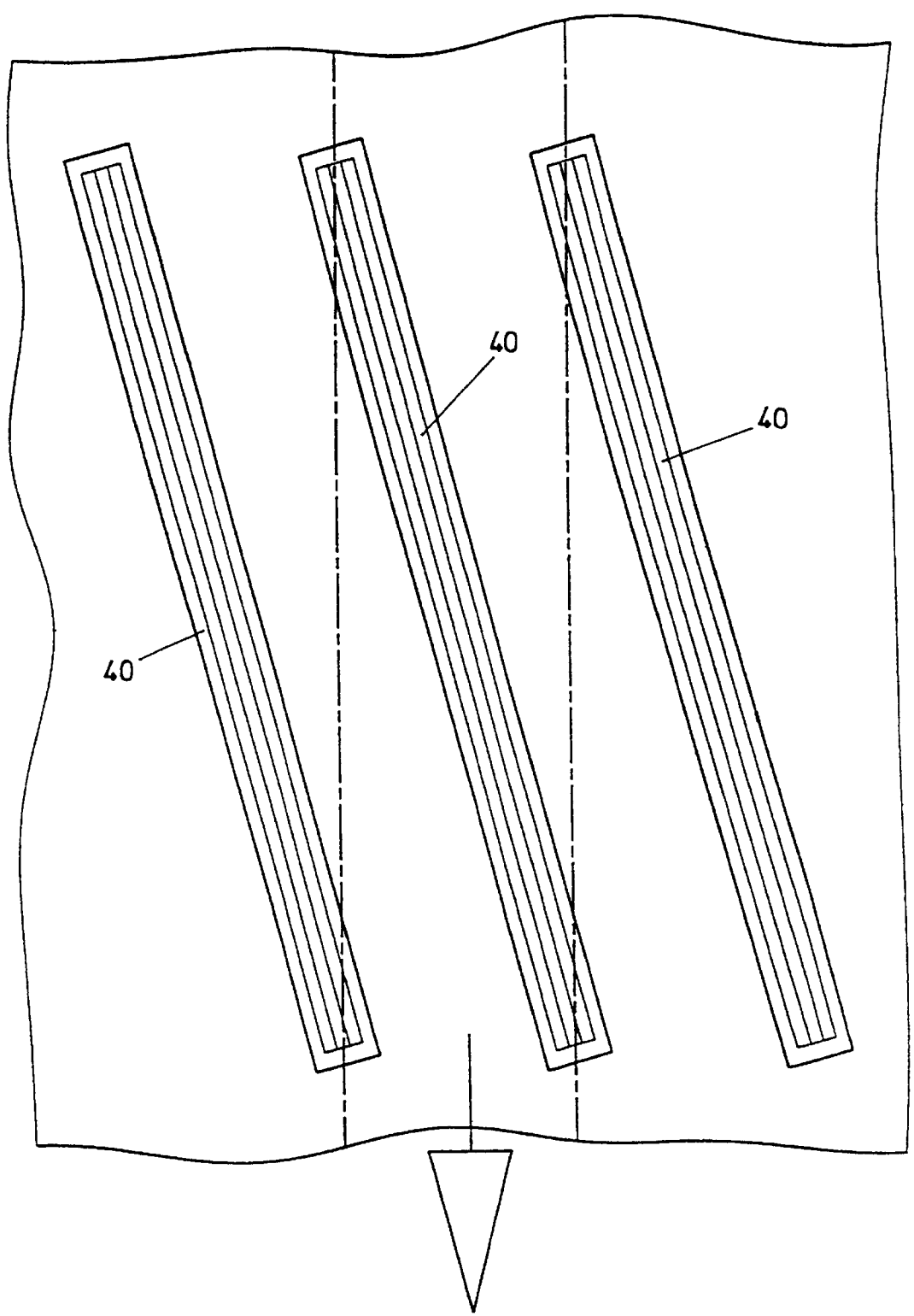

The infrared radiators 40 are slanted in the manner depicted in FIG. 5 relative to the individually radially adjustable adjusting elements 17 so that the end regions of the infrared radiators 40 can overlap, seen in the axial direction, so that owing to this inclined position essentially the same amount of heat is fed to the individual film sectors.

What is claimed is:

1. Device for heating a blown film web (1), inflated into a blown film bubble (1') between a pair of forward draw rolls (4) and a pair of take off rolls (5), said device comprising a frame (2) mounted, driven pair of forward draw rolls (4) for a flat lying blown film web (1), comprising an opposite, stationarily mounted, driven pair of take off rolls (5), which are intended for the collapsed blown film web hauled off the inflated bubble (1'), and upstream of which are collapsing mechanisms, preferably wedge shaped collapsing boards, comprising mechanisms for inflating the blown film web (1) between the pairs of forward draw and take off rolls (4, 5) into a bubble (1') and for refilling blowing air and comprising a device for heating the inflated blown film web, characterized in that the heating device comprises heating elements (40), which are arranged concentricly around the axis of the inflated blown film web (1) and which can be moved toward and away from the blown film web (1) by means of regulating drives in the radial direction.

2. Device, as claimed in claim 1, characterized in that the regulating drives move all of the heating elements (40) simultaneously in the radial direction.

3. Device, as claimed in claim 2, characterized in that the regulating drives comprise parallel cores (15, 16), which are mounted stationarily on the frame and whose inner coupling members (17) bear the heating elements (40), end that the coupling members (17) are provided with slide bolts (18) for the purpose of moving radially said coupling members, said slide bolts being guided in oblong slots (19) of an adjusting element (20), which lies parallel to the coupling members (17), and characterized in that to move the adjusting elements (20) radially there are spindle drives (22 to 26).

4. Device, as claimed in claim 1, characterized in that the spindle drives (22 to 25) are driven over bevel gears (24, 25) by means a driven revolving chain (28).

5. Device, as claimed in claim 1 characterized in that the heating elements (41), which are mounted stationarily on the frame, are arranged between heating elements (40), which are moved to the largest diameter.

6. Device, as claimed in claim 1, characterized in that the heating elements (40, 41) are infrared radiators.

7. Device, as claimed in claim 1, characterized in that the oblong heating elements (40, 41) are slanted relative to the axis of the inflated blown film web (1).

8. Device, as claimed in claim 1, characterized in that there is a distance meter (35), which scans the diameter of the inflated film tube and whose signals are fed to a controller (36), which adjusts the regulating motor or motors (29) for moving the heating elements (40) to the desired distance.

9. Device, as claimed in claim 1, characterized in that there is a device (8), measuring the thickness distribution of the wall thickness over the circumference of the blown film web or the collapsed film tube hauled off the bubble, and there is a regulator (36), which controls the heating energy, fed to the respective heating elements, in proportion to the deviation of the measured film thickness from the average film thickness (desired value).

10. Device, as claimed in claim 1, characterized in that there is a device (8), measuring the thickness distribution of the wall thickness over the circumference of the blown film bubble or the collapsed film tube hauled off the bubble, and there is a regulator (36), which controls in such a manner the regulating motors, assigned to the individual heating elements that a proportionally greater or smaller amount of heat is fed to the respective film sectors.

* * * * *